United States Patent [19]

Dlugos

[11] 4,047,585
[45] Sept. 13, 1977

[54] SCALE OPTICAL DETECTOR WITH SPRING CONSTANT VARIATION COMPENSATOR

[75] Inventor: Daniel F. Dlugos, Huntington, Conn.
[73] Assignee: Pitney-Bowes, Inc., Stamford, Conn.
[21] Appl. No.: 664,579
[22] Filed: Mar. 8, 1976
[51] Int. Cl.² .................. G01G 3/00; G01G 23/36
[52] U.S. Cl. .................. 177/210 R; 177/DIG. 6; 250/237 G; 356/169
[58] Field of Search ............ 177/210 R, DIG. 6; 356/169; 250/237 G, 231 R

[56] References Cited
U.S. PATENT DOCUMENTS

| | | | |
|---|---|---|---|
| 3,867,037 | 2/1975 | Litke | 356/169 |
| 3,923,110 | 12/1975 | Dan | 177/210 |

*Primary Examiner*—Joseph W. Hartary
*Attorney, Agent, or Firm*—Robert S. Salzman; William D. Soltow, Jr.; Albert W. Scribner

[57] ABSTRACT

An optical detection system for a spring scale includes an apparatus for generating a moire interference fringe pattern and detecting the pattern movement to measure scale tare deflection and thereby determine the load weight. One of a pair of ruled parallel grating sets is fixed while the other is mounted to the tare structure in alignment with the fixed set. A lamp projects the interference pattern upon a photodetector array. The placement of a load upon the scale deflects the tare structure which results in a linear movement of the projected fringe pattern across the photodetector array and the resultant sequential generation of weight indicative signals. To compensate for variations in the spring constant of selected scale springs, the linear tare deflection required to provide movement of a given number of interference fringes past a reference is adjustable. This adjustment of effective spring constant is achieved by varying the angle of the gratings of the movable grating set.

14 Claims, 5 Drawing Figures

SCALE OPTICAL DETECTOR WITH SPRING CONSTANT VARIATION COMPENSATOR

BACKGROUND OF THE INVENTION

1. Field of the Invention

The invention relates to spring scales and more particularly to spring scales employing an optical readout apparatus for the detection of scale deflection.

2. Brief Description of the Prior Art

In order to provide spring weighing scales at practical costs certain dimensional manufacturing tolerances have been included in spring specifications. These manufacturing tolerances provided scale springs with variations of spring constant, which variations have detracted from the accuracy of weight readings.

For example, springs employed in leaf spring scales such as that illustrated in U.S. Pat. No. 3,807,517 typically included manufacturing tolerances in leaf thickness, width and length. Variations in spring length within tolerance limits were compensated by adjustment at the spring end clamps. Further, length and width variations within tolerance limits were but minimal compared with the length and width dimensions; thus, relatively small errors were encountered due to tolerances in these dimensions. Variations in thickness, however, could not be easily compensated and have produced significant variations in spring constants due to the relatively small thickness dimensions. A typical variation of 1.3% in leaf spring thickness has resulted in a 5% variation in spring constant.

The prior attempt to provide a compensating adjustment at an optical detector for variation in spring constant has not met with commercial success due to numerous disadvantages inherent in the prior optical detectors. U.S. Pat. No. 3,186,148 is illustrative of such prior attempt and discloses a spring scale comprising a pair of vertically spaced, parallel leaf springs, which was utilized in a mail processing system. An optical detector associated with the scale included a bank of multiple photodetectors at the end of a light path. A descending shutter carried by the tare was operable to gradually block the light path to successive photodetectors of the bank. The number of photodetectors remaining in the light path provided a signal indicative of tare deflection, which signal was utilized to set the postage to be imprinted on the piece of mail.

The photodetector bank was mounted to a generally vertical arm which was pivotable to cause the vertical distance between successive photodetectors of the bank to change with respect to the direction of shutter movement. Photodetector arm adjustment effected a compensation for variations in spring constant.

Several disadvantages accompanied the use of this prior optical readout apparatus. For example, numerous photodetectors were required to provide weight indicative signals over a small weight load range. Furthermore, the number of photodetectors increased with increased scale capacity. Additionally, the particular transition point wherein each photodetector switched, for example from conduction to nonconduction state, had to be individually set for successive postage weight increments. These transition points were highly critical, and tolerance requirements rendered final adjustments difficult and time consuming.

A further disadvantage of this prior system related to the relatively large projection path, e.g. 18 inches to 24 inches (45–60 cm.), which was required in order to obtain the necessary optical magnification. As a result of such large projection path and the critical switching points, accuracy of readouts was highly sensitive to vibrations and other environmental conditions.

SUMMARY OF THE INVENTION

In compendium, the present invention relates to a spring weighing scale having an optical detector for sensing tare deflection by generating a moire fringe pattern and moving the pattern as an amplified direct function of the tare deflection. The pattern is generated by modulation of a light beam by a pair of ruled parallel grating sets. Deflection of one of the grating sets as a result of tare deflecton produces sequential movement of successive moire fringes or bands across an array of photodetector pairs. A fixed grating set is mounted within one of two spaced arms of a transducer body while a light source is mounted in the other arm. A movable grating set is positioned within a vertical plane between the arms.

A mounting assembly interconnects the movable grating set with the tare structure and provides for unitary movement of both the tare structure and the grating set within a vertical plane. The mounting assembly further provides for adjustment of the angular orientation of the gratings with respect to the vertical direction of tare deflection to provide compensating adjustment for tolerance differences in various springs which may be selected for use in the scale.

The light source includes an incandescent lamp having a single substantially straight filament, the lamp is rotatably mounted to its transducer arm so that its filament may be adjusted for coincidence with the grating angle of the movable grating set to thereby provide a favorable signal to noise ratio.

From the foregoing compendium, it will be appreciated that it is an object of the present invention to provide a weighing scale of the general character described having an optical detector which, however, is not subject to the aforementioned disadvantages of prior detectors.

Another object of the present invention is to provide a weighing scale of the general character described having an optical detector which is accurate, reliable, simple in construction and suitable for mass production fabrication techniques.

A further object of the present invention is to provide a weighing scale of the general character described having an optical detector which may be readily adjusted to provide compensation for variations in spring constants.

A still further object of the present invention is to provide an optical detector of the general character described adapted for spring scale applications and which permits greater tolerance latitudes for springs by providing compensating adjustment.

Another object of the present invention is to provide a method of constructing a spring scale of the general character described which significantly reduces manufacturing costs by permitting greater spring tolerances Yet a further object of the present invention is to provide a method of constructing a spring scale of the general character described which provides accurate weight determination, yet is suitable for economical mass production techniques.

A further object of the present invention is to provide a method of furnishing compensating adjustments for spring constant variations in a spring scale optical detector.

Other objects of the present invention in part will be obvious and in part will be pointed out hereinafter.

With these ends in view the invention finds embodiment in certain combinations of elements and arrangements of parts by which the objects aforementioned and certain other objects are attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention:

FIG. 5 is a greatly enlarged schematized representation of a moire interference pattern and illustrating the spring constant compensating effect of changes in the grating angle of a movable grating set.

DESCRIPTION OF THE PREFERRED EMBODIMENT

Figure 1:
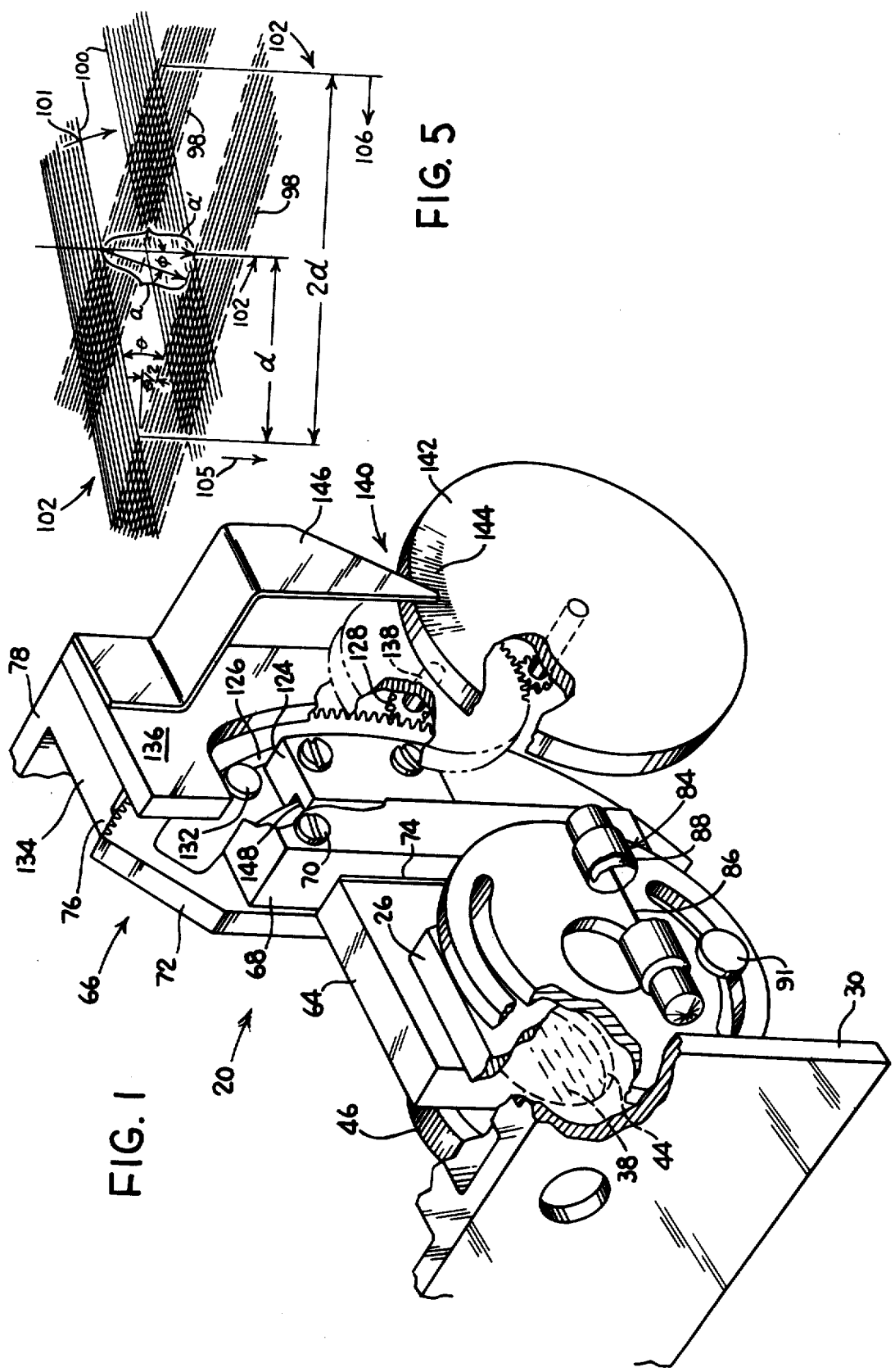
FIG. 1 is an enlarged fragmentary perspective illustration of an optical detector constructed in accordance with and embodying the invention with portions thereof broken away for the purpose of more clearly illustrating details of the invention.

Referring now in detail to the drawings wherein a typical exemplary embodiment of the invention is illustrated, the reference numeral 10 denotes a leaf spring scale (shown in FIG. 2) such as that described in United States Letters Patent No. 3,877,513 issued Apr. 15, 1975.

It should be appreciated that the scale 10 is designed to provide substantially linear deflection as a result of different weights carried in a tray (not shown) supported by a tare structure 12. The tare structure 12 is secured to the distal edges of a pair of horizontally oriented, vertically spaced, broad leaf springs 14, 16. Each leaf spring is cantilever supported at its opposite edge to an inclined mounting frame 18 as is more fully described in both the aforementioned U.S. Pat. No. 3,877,513 and in U.S. Pat. No. 3,807,517, issued Apr. 30, 1974.

An optical detector 20 constructed in accordance with the invention is positioned within the scale 10 between the leaf spring 14, 16 to detect vertical tare structure displacement as a result of a load being supported by the tare structure 12. As heretofore mentioned, the movement of a moire fringe pattern for the detection and measurement of load weight is utilized in the present invention. For this purpose a pair of ruled parallel grating sets on transparent substrates is provided with one of the sets being fixed and the other set moving with the tare structure 12 in a plane parallel to the fixed set. By way of example, the gratings of each set may comprise Ronchi rulings spaced two thousandths of an inch apart. Spacings between the rulings of each grating set, however, may vary.

The optical detector 20 includes a transducer body 22 which is adjustably fixed to a mounting pad 24 extending from the mounting frame 18. The transducer body 22 includes a pair of parallel vertically oriented arms 26, 28 (FIG. 3) which project from a generally planar base 30. The base 30 is, in turn, secured to a dovetail mounting platform 32 by conventional fastening means.

A mounting plate 34 interconnects the mounting platform 32 and the frame mounting pad 24. To join the plate 34 and the dovetail platform 32, a plurality of screws 35 (FIG. 3) extend through oversized apertures in the mounting plate 34 and engage threaded apertures in the platform 32.

A fixed grating set 38 formed on a planar face of a transparent, e.g., glass, substrate 40 is mounted on the forward end of a cylindrical sleeve 42. The sleeve 42 is seated in a transverse bore 44 which extends along a horizontal axis through the transducer arm 28. In order to adjust the grating set 38, the sleeve 42 is axially movable within the bore. After the desired grating position has been attained, the distal end of the sleeve is clamped to an annular adjustment ring 46 by a set screw 48.

Further translational adjustment is achieved by the dovetail mounting between the platform 32 and the mounting plate 34 which permits translational movement of the entire transducer body 22 within a horizontal plane. For this purpose, upper and lower dovetail shelfs 50, 52 respectively extend from the mounting plate 34. The shelfs 50, 52 are fixed in spaced horizontal planes for sliding engagement with the respective upper and lower dovetail edges of the mounting platform 32.

The mounting platform 32 is spring biased against a ball 51 seated in a hollow conical tip 53 at the end of an adjustment screw 54. The adjustment screw 54 is theadingly engaged in a horizontal bore which extends through a vertical flange 56 projecting from a vertical edge of the mounting plate 34. The opposite vertical edge of the mounting plate 34 includes a further flange 58 within which a biasing spring 60 is seated. Rotation of the adjustment screw 54 provides translational movement of the entire transducer body 22 along a horizontal plane.

A movable grating set 62 formed on a planar face of a transparent substrate 64 is mounted for movement in a vertical plane between the transducer arms 26, 28. Pursuant to the present invention, a mounting assembly 66 secures the movable grating set 62 to the tare structure for unitary movement, while permitting adjustment of the grating angle, i.e., the angle between the rulings of the grating set 62 and a horizontal plane, to thereby provide adjustment compensation for variations in spring constant as will be hereinafter described.

With reference to FIG. 1 it should be noted that the planar face of the substrate 64, which carries the rulings of the grating set 62, is secured to the mounting assembly 66 by a generally channel-shaped clamp 68 having upper and lower legs which are shorter in length than the thickness of the substrate 64. A pair of mounting screws 70 urge the clamp 68, hence the substrate 64, against a planar wall of a gear sector 72. An elastomeric shim 74 is positioned between the clamp 68 and the substrate 64. The substrate 64 is slid into the clamp 68 until it contacts a pair of abutment pins 75 which project from the gear sector. Subsequently the clamp 68 compresses the shin 74 against the substrate 64 by rotation of the screws 70. The gear sector 72 is in turn adjustably secured to a base subassembly 76, a base flange 78 of which is conventionally mounted to a mounting pad 80 of the tare structure 12.

In order to provide a light beam for modulation by the grating sets, a bore 82 in axial alignment with the bore 44 extends through the arm 26 of the transducer body 22. An incandescent lamp 84 having a substantially straight single filament 86 and a reflector panel 88 is secured in a fuse type lamp holder. The lamp holder is in turn mounted to a supporting disc 90 which is rotatably secured to the transducer arm 26 with the bore 82 extending through both the arm 26 and the disc 90. The disc 90 is locked in a selected position by a pair of screws 91 which extend through opposed arcuate slots in the disc to engage threaded apertures in the arm 26. A condensing lens 92 is positioned in the bore 82 within the arm 26 between the lamp 84 and the movable grating set 62 to project the light beam perpendicular to and through both grating sets 62, 38.

Because the gratings of the fixed grating set 38 are positioned at a slight skew angle with respect to the ideally horizontal gratings of the movable grating set 62, the interference between the two grating sets modulates the light beam to have a plurality of cycle parallel moire fringes.

The tare structure 12, hence the movable grating set 62, moves downwardly when a load is placed upon it. Due to the extended lateral width of the leaf springs 14, 16, lateral deflection of the movable grating set 62 during this downward movement is minimized. Thus, the grating sets 38, 62 are maintained in substantially parallel spaced relationship permitting the optical projection of the moire pattern with high resolution. Precise adjustment of the initial parallel juxtaposition of the grating is achieved by rotative movement of the entire transducer body 22 about a mounting pin 94 having a spring washer 96 at its end. The pin 94 extends between the transducer base 30 and the mounting platform 32. After the parallel orientation between the grating sets is achieved through adjustment by rotation of the transducer body about the pin 94, the transducer position is locked by tightening the mounting screws 36.

Spacing between the grating sets 38, 62 is adjusted by both transducer body translational movement through the adjusting screw 54 and axial adjustment of the sleeve 42 with respect to the ring 46.

Figure 4:
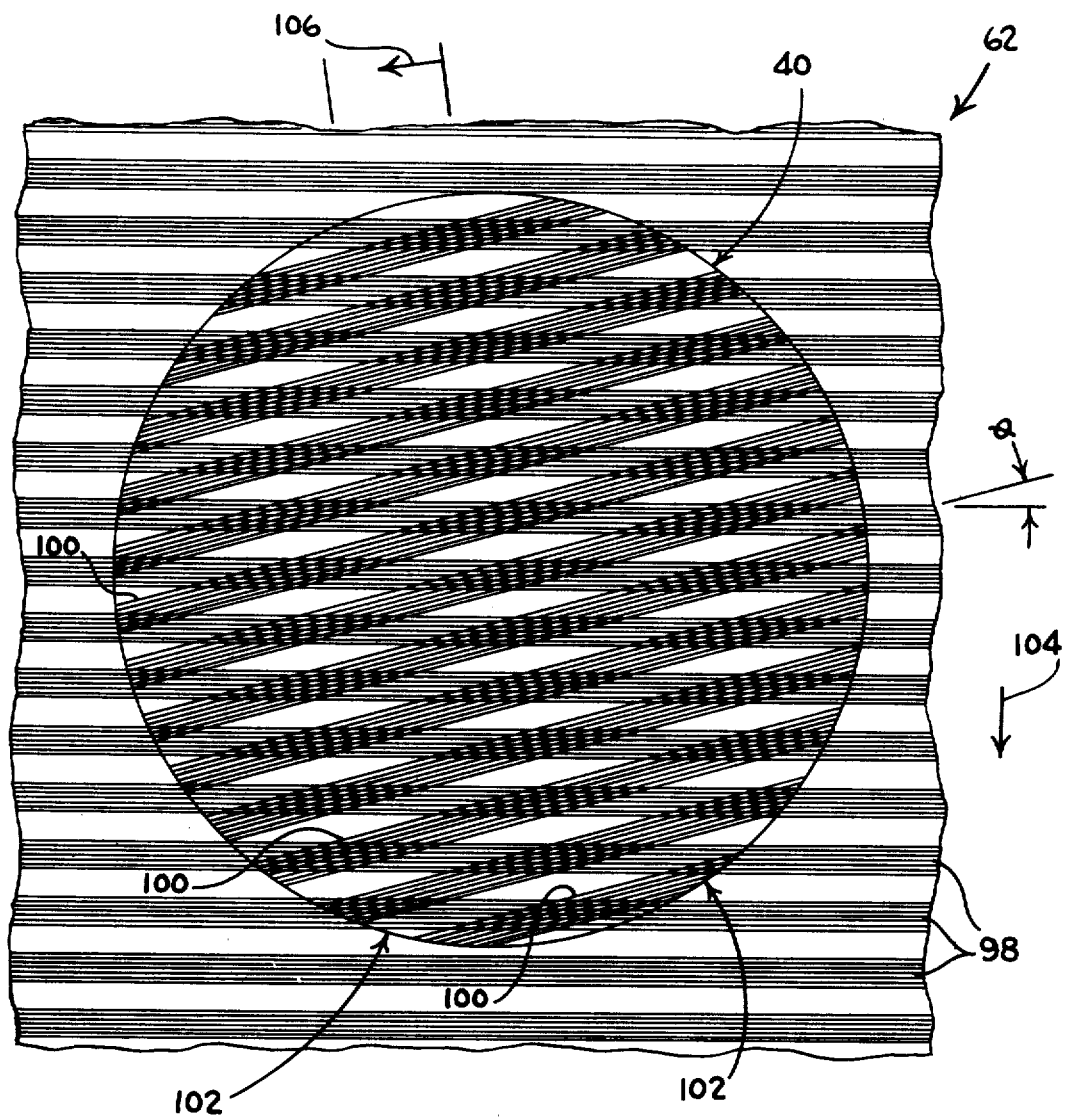
FIG. 4 is an enlarged diagrammatic representation of the typical appearance of a moire interference pattern which may be generated by the optical detector of the present invention.

With reference now to FIG. 4 wherein an enlarged diagrammatic representation of the generation of a typical moire interference pattern is depicted, a portion of the movable grating set 62 is shown with individual gratings 98 thereof in their normal horizontally oriented position. The horizontal position is utilized under ideal conditions when the actual spring constant is coincident with the desired spring constant.

Figure 3:
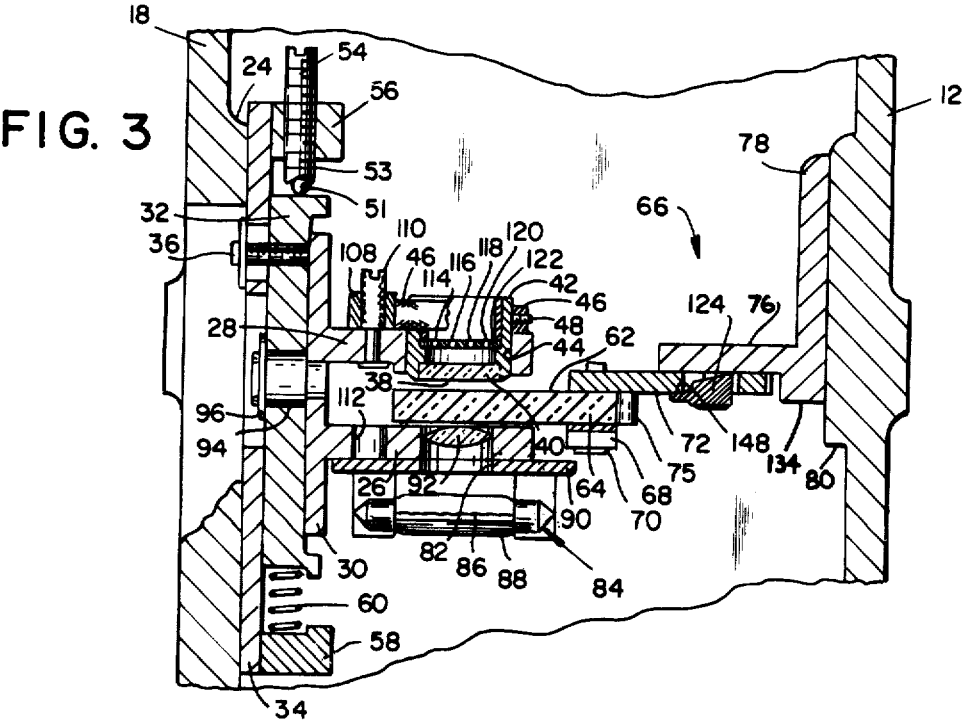
FIG. 3 is a fragmentary sectional view through the scale, the same being taken substantially along the line 3—3 of FIG. 2.

The fixed grating set 38 is shown overlapping the movable grating set 62 and is circular in configuration because it is seated in the cylindrical sleeve 42 (FIG. 3). The grating set 38 comprises a plurality of individual gratings 100 which are oriented at a skew angle $\theta$ with respect to the horizontal. It can be observed that the intersecting gratings 98, 100 generate an interference pattern having a plurality of dark moire fringes 102 which are substantially vertical. Vertical movement of the movable grating set 62 in the direction of arrow 104 causes the fringes 102 to move toward the left in the direction of arrow 106. The geometric relationship is such that a selected fringe 102 will move horizontally one full fringe spacing distance while the grating set 62 moves vertically only one grating spacing distance.

The distance between successive fringes 102 may be adjusted by varying the skew angle $\theta$, and precise adjustment of fringe spacing is achieved by controlled rotative adjustment of the sleeve 42 which carries the fixed grating set 38. To provide such skew angle adjustment, the ring 46 (FIGS. 1 and 3) includes a knurled periphery which is engaged by an elastomeric bank 108 secured over a rotatable slotted post 110 which is journalled in the transducer arm 28. Rotation of the post 110 thereby effects a reduction gear drive adjustment of the skew angle $\theta$. An access aperture 112 is positioned in the arm 26 for the purpose of assembly of the adjustment post 110.

The fringe movement is detected and counted to furnish a signal indicative of the weight of the load, e.g. an envelope. Such signal, in an application such as an automated mail processing environment, may be processed and utilized to determine and control the amount of postage to be imprinted upon a piece of mail at a subsequent station.

Movement of the moire interference pattern is sensed by a plurality of photodetectors 114, 116, 118, 120 (FIG. 3). Although four photodetectors are illustrated, satisfactory results have been obtained with only two photodetectors which sense both the magnitude and direction of pattern movement. The photodetectors are mounted within a nonconducting disc 122. Each photodetector is equidistantly spaced from one another and positioned along an axis coincident with a diagonal of the disc.

The disc 122 is secured within the inner bore of the sleeve 42 in abutment against a peripheral stop. It should be appreciated that each of the photodetectors is optimally placed 90° apart from each adjacent photoconductor with respect to the moire interference pattern with moves across the array.

The photodetectors 114, 118 are arranged to provide a single output signal, while the photodetectors 116, 120 are similarly arranged to provide a single output signal. Each interconnected pair of photodetectors is physically disposed 90 degrees from each other so that the combined output signal of each pair is in phase quatrature with respect to the other pair and provides a reinforcement signal.

The output signals of the photodetector pairs are processed utilizing circuitry well known in the art, for example that shown in U.S. Pat. Nos. 2,886,718 or 3,713,139 and counted to provide a signal suitable for optical display and indicative of the weight of the load carried by the tare.

Returning now to the compensating adjustments which are provided by the optical detector 20 for differences in spring constants, it should be appreciated that if a selected spring is within tolerance limits, yet thinner than the optimum thickness, the spring would be softer, hence the spring would deflect a greater distance per unit weight than a spring having the ideal spring constant.

In order to compensate for tolerance variations of the manufactured springs, it has been found that a rotation of gratings 98 will provide a spring constant variation. This will be shown to be true with reference to FIG. 5.

As aforementioned, to provide horizontal movement (arrow 106) of the fringe 102, the gratings 98 must deflect downwardly as shown by arrow 105. In order to move the fringe 102 a full fringe spacing "d", the gratings 98 must move downwardly a distance a (when the gratings 98 are horizontally positioned).

Now, when the gratings 98 are caused to be rotated (arrow 101) from the horizontal an angle "φ", the vertical displacement of gratings 98 necessary to provide a full fringe spacing d will change, such that: $a/2 \sin \theta/2 = d$.

Or put another way:

$$d = \frac{a/2}{\sin \theta/2} = \frac{a}{2} \csc \theta/2$$

For small angles, i.e. $\theta < 8°$, d will be approximately equal to $a/\theta$:

$$d \approx a/\theta$$

where $\theta$ is expressed in radians.

From the above, it will be evident that variations in the spring constant of the springs of the scale can be compensated for, by changing the grating angle φ with respect to the vertical axis. In other words, the deflecting distance necessary to provide movement of one full fringe spacing d will now be a', a distance greater than displacement distance a :

$$a' > a.$$

Figure 2:
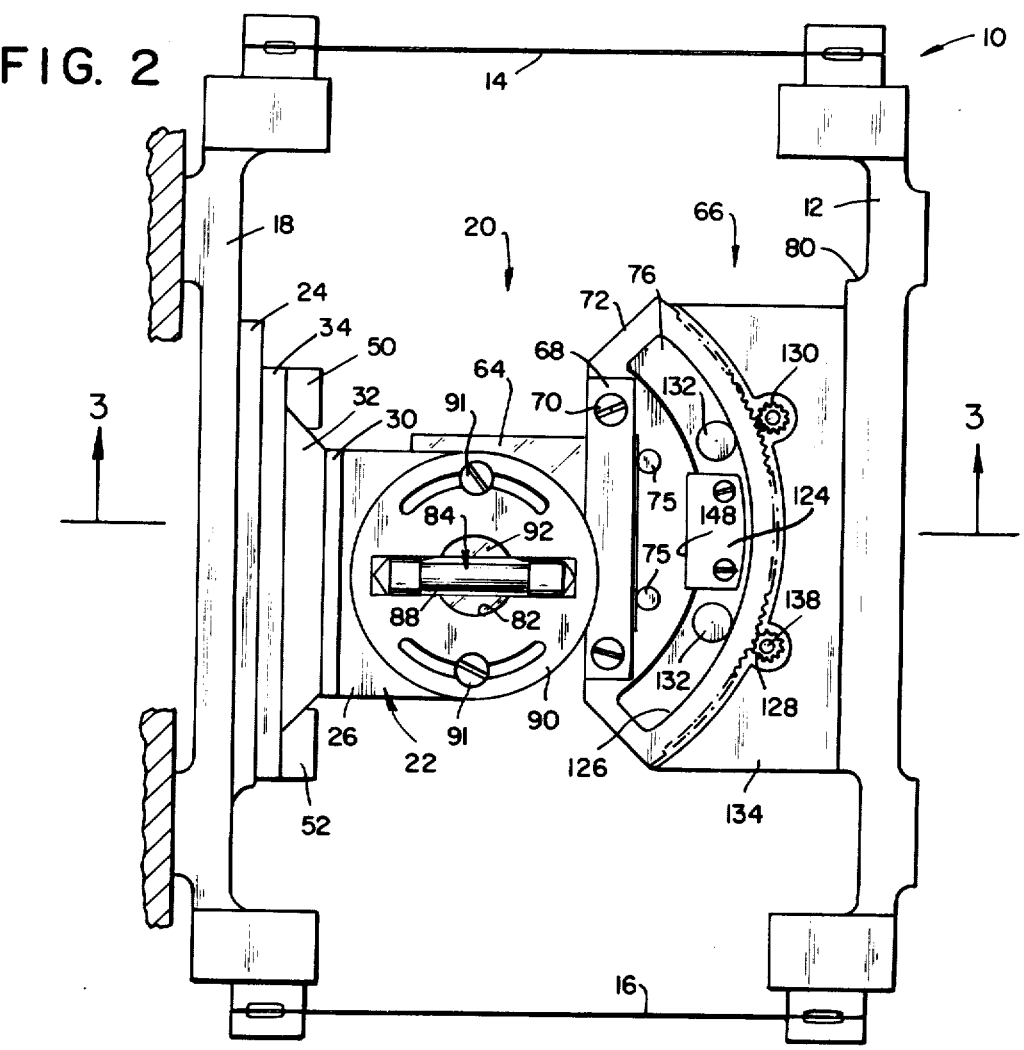
FIG. 2 is a side elevation view of a typical scale constructed in accordance with the invention and showing the optical detector partly disassembled for the purpose of better illustrating a mounting assembly which adjustably secures an optical grating to a scale tare structure so that the angular orientation of the gratings may be adjusted to compensate for variations in spring constants.

With reference now to FIGS. 1 and 2, it will be seen that in order to mechanically provide the desired grating angle adjustment, the gear sector 72 is abutted against a planar face of the base subassembly 76 and held in a desired position by a clamp 124 positioned in an arcuate slot 126 of the gear sector 72. A driving gear 128 and an idler gear 130 are journalled for rotation in the subassembly 76 in engagement with the teeth of the gear section 72. In order to provide meshing engagement between the gear sector 72 and the gears 128, 130, a pair of rollers 132 are journalled through the subassembly 76 and engage a wall of the slot 126 radially opposite each of the gears 128, 130. The rollers 132 may be cam adjustable for movement in a radial direction toward the respective gears 128, 130 to reduce backlash between the gear engagement.

A shelf 134 extends forwardly from the base subassembly 76 toward the gear sector 72 and includes an arcuate periphery adjacent the gear sector. The shelf 134 provides a mounting surface against which a cover plate 136 is secured. The cover plate 136 includes a bore through which a shaft 138, fixed to the gear 128, is journalled.

A gear train 140 journalled through the cover plate 136 provides a rotative movement of the gear 128. A driving knob 142 of the gear train includes a plurality of reference markers 144 which may be used in conjunction with an indexing bracket 146 to assist in setting a suitable grating angle φ for compensation of variations in spring constants. After the desired grating angle is set, a pair of screws securing the bracket 124 to the subassembly 76 are tightened so that a lip 148 of the bracket 124 tightens the gear sector against the base subassembly 76.

The lamp 84 is then rotated so that its filament 86 is approximately coincident with the grating angle φ to provide a favorable signal to noise ratio. This adjustment is done by rotating the lamp holding disc 90 and tightening the clamping screws 91 when the desired orientation is achieved.

While it is readily apparent that the compensating grating angle adjustment will reduce manufacturing costs by permitting wider latitude in spring specifications, a further reduction in costs would be achieved by incorporating the toothed portion of the gear section 72, the idler gear 130, the driving gear 128 and the gear train 140 in an assembly tool. The tool would be affixed to the sector 72 and subassembly 76 during assembly of the scale 10 and removed after the spring constant compensating adjustment has been effected and the grating set 62 locked at the desired grating angle.

It should be appreciated that the optical detection system of the present invention as heretofore described will find application in virtually any spring scale and should not be limited to the leaf spring embodiment described as the exemplary embodiment.

Thus, it will be seen that there is provided a scale and optical detection system which achieves the various objects of the invention and which is well suited to meet conditions of practical use.

As various changes might be made in the optical detector as above set forth, it is to be understood that all matter herein described or shown in the accompanying drawings is to be interpreted as illustrative and not in a limiting sense.

Having thus described the invention, there is claimed as new and desired to be secured by Letters Patent:

1. A weighing scale comprising a tare structure including load supporting means, spring means having a spring constant and adapted to provide substantially linear vertical displacement of the tare structure as a direct function of the mass of a load being weighed, and an optical detector for determining the extent of tare structure displacement, the detector including a first optical grating, means fixing the first optical grating with respect to tare structure displacement, a second optical grating, means interconnecting the second optical grating to the tare structure for unitary movement therewith the detector further including means providing a light beam, the gratings being so positioned as to modulate the light beam to have a cyclic optical interference pattern, the interference pattern including a plurality of spaced moire fringes, movement of the second grating providing movement of the fringes, photodetector means positioned in alignment with the interference pattern and adapted to detect pattern movement, and compensating means including means to adjustably vary the angle of both said first and said second gratings with respect to the direction of tare structure displacement, said compensating means adapted to compensate the interference pattern to provide pattern movement equivalent to a displacement of the second grating which is greater than the actual displacement, whereby compensation for variation in spring constants is provided.

2. A weighing scale constructed in accordance with claim 1 wherein the means interconnecting the second grating to the tare structure includes the means varying the angle of the second grating.

3. A weighing scale constructed in accordance with claim 2 wherein the interconnecting means includes a base subassembly, means fixing the subassembly to the tare structure, a grating support and means fixing the second grating to the support, the means varying the angle of the second grating including means providing controlled angular displacement between the subassembly and the support and means fixing the support to the subassembly at a desired angular displacement.

4. A weighing scale constructed in accordance with claim 3 wherein the means providing controlled angular displacement between the subassembly and the support includes gearing means.

5. A weighing scale constructed in accordance with claim 2 wherein the means providing the light beam includes an incandescent lamp, the lamp having a single, substantially straight filament, the filament lying within a plane parallel to the gratings, and means adjustably fixing the lamp at a position wherein the longitudinal axis of the filament is complementary to the angle of the second grating, whereby a favorable photodetector signal to noise ratio may be attained.

6. An optical detector for determining the weight of a load carried by a spring scale tare structure, the detector comprising a first optical grating adapted to be fixed with respect to tare structure deflection, a second optical grating adatped to be operatively interconnected to the tare structure for movement therewith, means providing a light beam, the gratings being so positioned as to modulate the light beam to have a cyclic optical interference pattern including a plurality of spaced moire fringes, the movement of the second grating providing movement of the frings, photodetector means positioned in alignment with the interference pattern and adapted to detect fringe movement, and compensating means including means to adjustably vary the angle both gratings with respect to the direction of the tare structure displacement said compensating means compensating the interference pattern to provide pattern movement equivalent to a displacement of the second grating set which is greater than the actual displacement, whereby compensation for variation in spring scale constants may be provided.

7. A weighing scale comprising a tare structure including load supporting means, spring means providing substantially linear vertical displacement of the tare structure as a direct function of the mass of a load being weighed, an optical detector for determining the extent of tare structure displacement, the detector including a first optical grating, means fixing the first optical grating with respect to tare structure displacement, a second optical grating, means interconnecting the second optical grating to the tare structure for unitary movement therewith, the detector further including means providing a light beam, the gratings being so positioned as to modulate the light beam to have a cyclic optical interference pattern, the interference pattern including a plurality of spaced moire fringes, movement of the second grating providing movement of the fringes, photodetector means positioned in alignment with the interference pattern and adapted to detect pattern movement, and means adjustably varying the spacing between the fringes of the interference pattern, the varying means including means mounting the second grating for rotation in a plane parallel to the plane of the second grating and mechanical reduction drive means adapted to provide precisely controlled adjustment of the angle of rotation of the second grating.

8. A weighing scale constructed in accordance with claim 7 wherein the means adjustably varying the spacing between the fringes further includes a cylindrical sleeve, the first grating being positioned within the sleeve adjacent one end thereof, and a friction ring, the ring being secured to the sleeve adjacent the other end thereof, and the reduction drive means including a pinion drivingly engaging the ring.

9. A weighing scale constructed in accordance with claim 9 further including a transducer, the transducer including the means providing a light beam, the first optical grating and the photodetector means, the sleeve being journalled for rotation within the transducer.

10. In a weighing scale having a frame, a displaceable tare structure carried by said frame, spring means for yieldably opposing displacement of said tare structure, said spring means having a spring constant that is within a tolerance range, and an optical detector system for determining the extent of tare structure displacement, said optical detector system including means for providing a light beam, first and second optical grating sets, each of said grating sets having an optical grating, said first grating set being carried on said frame, and said second grating set being mounted so as to move with said tare structure, the respective optical gratings of said first and second grating sets being adapted to be positioned at an angle with respect to one another so as to be capable of modulating said light beam and generating a pattern of moire optical interference fringe lines, movement of the grating set that moves with said tare structure producing movement of said fringe lines, and photodetector means for detecting said movement of said fringe lines; the improvement comprising means mounting one of said grating sets for angular positional adjustment with respect to the tare structure so as to thereby afford an optical compensation capability for variations in the spring constants of spring means which are within said tolerance range and which are to be used in said scale; and means mounting the other of said optical grating sets for angular positional adjustment with respect to the said one adjusted grating set so that said optical gratings may be mutually angularly positioned so as to generate said moire pattern of optical interference fringe lines.

11. A weighing scale constructed in accordance with claim 10, wherein the means providing the light beam includes an incandescent lamp having a single substantially straight filament, said filament being adapted to be disposed in a plane that is substantially parallel to one of said gratings whereby a favorable photodetector signal to noise ratio may be attained.

12. A weighing scale constructed in accordance with claim 10, wherein said means mounting said one of said grating sets includes a cylindrical sleeve, and wherein said sleeve is rotatably carried by said tare structure; and additionally comprising a reduction drive means for rotatably driving said cylindrical sleeve to precise angular positions.

13. In a weighing scale having a frame, a displaceable tare structure carried by said frame, said tare structure being displaceable as a function of the mass of a load being weighed, spring means for yieldably opposing said tare displacement, said spring means having a spring constant that is within a tolerance range, and an optical detector system for determining the extent of tare structure displacement, said optical detector system including means for providing a light beam, first and second grating sets, each of said grating sets having an optical grating, said first grating set being carried on said frame and the second grating set being mounted so as to move with said tare structure, the respective optical gratings of said first and second grating sets being adapted to be positioned at an angle with respect to one another so as to be capable of modulating said light beam and generating a pattern of moire optical interference fringe lines, movement of the second grating set with said tare structure producing transverse movement of said interference fringe lines, and photodetector means for detecting movement of said fringe lines; the improvement comprising means for mounting said second grating set for angular positional adjustment with respect to the tare structure so that for a given tare structure displacement a desired number of said interference fringe lines pass said photodetector means, said mounting means thereby affording a compensation capability with respect to variations in the spring constant of spring means which are within said tolerance range and which are to be used on said scale; and means mounting said first optical grating set for angular positional adjustment relative to said second adjusted grating set so that said optical gratings may be mutually angular positioned so as to generate said moire pattern of optical interference fringe lines.

14. A method of compensating for variations in the spring constants of the spring means that are to be used in a weighing scale, which scale comprises a frame, a displaceable tare structure carried by said frame, spring means for yieldably opposing displacement of said tare structure, and an optical detector system for determining the extent of tare structure displacement, said optical detector system including means for providing a light beam, first and second grating sets, each of said grating sets having an optical grating, the first grating set being mounted on said frame and the second grating set being mounted so as to move with said tare structure, said two optical gratings being adapted to be positioned at an angle with respect to one another so as to be capable of modulating said light beam and generating a pattern of moire optical interference fringe lines, movement of the grating set that moves with said tare structure producing transverse movement of said fringe lines, and photodetector means for detecting said movement of said fringe lines; said method comprising the steps of:

a. angularly adjusting said second grating set with respect to said tare structure so that for a given displacement of said tare structure a desired number of said fringe lines pass said photodetector means, this adjustment thus providing a compensating technique for an inaccurate spring constant of said spring means; and b. angularly adjusting said first grating set with respect to said adjusted second grating set so that said optical gratings of said sets are mutually angularly positioned so as to be capable of generating said moire pattern of optical interference fringe lines.

* * * * *